(12) United States Patent
Jeong et al.

(10) Patent No.: US 12,384,859 B2
(45) Date of Patent: Aug. 12, 2025

(54) PROCESS FOR PREPARING A CATALYST FOR OLEFIN POLYMERIZATION

(71) Applicant: HANWHA SOLUTIONS CORPORATION, Seoul (KR)

(72) Inventors: Tae Uk Jeong, Daejeon (KR); Hye Ran Park, Daejeon (KR); Seongjae Lim, Daejeon (KR); Ui Gap Joung, Daejeon (KR); Seungil Choi, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 892 days.

(21) Appl. No.: 17/298,620

(22) PCT Filed: Nov. 26, 2019

(86) PCT No.: PCT/KR2019/016300
§ 371 (c)(1),
(2) Date: May 31, 2021

(87) PCT Pub. No.: WO2020/116842
PCT Pub. Date: Jun. 11, 2020

(65) Prior Publication Data
US 2022/0025077 A1    Jan. 27, 2022

(30) Foreign Application Priority Data
Dec. 3, 2018    (KR) .................. 10-2018-0153342

(51) Int. Cl.
*C08F 4/6592*    (2006.01)
*C08F 4/02*    (2006.01)
*C08F 210/16*    (2006.01)

(52) U.S. Cl.
CPC ............ *C08F 4/65927* (2013.01); *C08F 4/02* (2013.01); *C08F 210/16* (2013.01); *C08F 2420/10* (2021.01)

(58) Field of Classification Search
CPC ...... C08F 4/65927; C08F 4/02; C08F 210/16; C08F 2420/10
USPC ........................................ 502/104, 150, 158
See application file for complete search history.

(56) References Cited

U.S. PATENT DOCUMENTS

| | | | |
|---|---|---|---|
| 6,300,436 B1 | 10/2001 | Agapiou | |
| 6,482,765 B1* | 11/2002 | Ohgane | C08F 10/00 526/943 |
| 11,267,917 B2* | 3/2022 | Joung | C08F 4/6592 |

FOREIGN PATENT DOCUMENTS

| | | | |
|---|---|---|---|
| CN | 1307597 A | 8/2001 | |
| EP | 0930320 A1 * | 7/1999 | ............ C08F 210/06 |
| JP | 2002520427 A | 7/2002 | |
| JP | 2004521163 A | 7/2004 | |
| JP | 2009502476 A | 1/2009 | |
| KR | 1020010083088 A | 8/2001 | |
| KR | 2014-0121771 A * | 10/2014 | ............ C08F 10/00 |
| KR | 1020140121771 A | 10/2014 | |
| KR | 1020150045368 A | 4/2015 | |
| KR | 1020150062145 A | 6/2015 | |
| KR | 101711788 B1 | 3/2017 | |
| WO | 2018021656 A1 | 2/2018 | |

OTHER PUBLICATIONS

English translation of the Written Opinion for PCT/KR2019/016300. (Year: 2020).*
International Search report dated Mar. 13, 2020.
JP Office Action dated Jun. 7, 2022.
Extended European Search Report(EESR) dated Jul. 12, 2022.
CN Office Action dated Sep. 30, 2022.

* cited by examiner

Primary Examiner — Patricia L. Hailey
(74) Attorney, Agent, or Firm — Harvest IP Law, LLP

(57) ABSTRACT

The present invention relates to a process for preparing a catalyst for olefin polymerization. Specifically, the present invention relates to a process for preparing a supported metallocene catalyst capable of producing a polyolefin in which the formation of gels is suppressed. In the process for preparing a supported metallocene catalyst according to an embodiment of the present invention, it is treated with a metallic stearate after a transition metal compound has been supported, which suppresses the formation of a macromolecular polyolefin. Thus, a polyolefin with minimal gel formation can be prepared.

11 Claims, No Drawings

PROCESS FOR PREPARING A CATALYST FOR OLEFIN POLYMERIZATION

CROSS-REFERENCE TO RELATED APPLICATIONS

This application is a National Stage of International Application No. PCT/KR2019/016300 filed Nov. 26, 2019, claiming priority based on Korean Patent Application No. 10-2018-0153342 filed Dec. 3, 2018.

TECHNICAL FIELD

The present invention relates to a process for preparing a catalyst for olefin polymerization. Specifically, the present invention relates to a process for preparing a supported metallocene catalyst capable of producing a polyolefin in which the formation of gels is suppressed by treating it with a metallic stearate after a transition metal compound has been supported.

BACKGROUND ART

A metallocene catalyst, which is one of the catalysts used in the polymerization of olefins, is a compound in which a ligand such as cyclopentadienyl, indenyl, and cycloheptadienyl is coordinated to a transition metal or a transition metal halide compound. It has a sandwich structure in its basic form.

In a Ziegler-Natta catalyst, which is another catalyst used in the polymerization of olefins, the metal component serving as the active sites is dispersed on an inert solid surface, whereby the properties of the active sites are not uniform. On the other hand, since a metallocene catalyst is a single compound having a specific structure, it is known as a single-site catalyst in which all active sites have the same polymerization characteristics. A polymer prepared by such a metallocene catalyst is characterized by a narrow molecular weight distribution and a uniform distribution of comonomers.

Polyethylenes produced by a metallocene catalyst have short chain branches (SCBs) of a certain length and generally do not have long chain branches (LCBs). However, when a polymer is produced at the active sites in the pores of a catalyst, polyethylenes may have long chain branches, or macromolecules may be generated, depending on the shape, structure, and type of the catalyst.

Meanwhile, when a polyolefin resin is melted and processed, there may be present components that are not completely melted, such unmolten mass being called a gel. When such gels are present in a polyolefin resin, a film made from this resin may have deteriorated transparency or product appearance, which is not preferable.

Usually, gels may be formed due to the catalyst. In addition, gels (or foreign substance gels) may be formed by foreign substances during the production and processing of a resin, and gels (or non-dispersed or non-uniform gels) may be formed due to incomplete extrusion, differences in molecular weight/density, and the like between resins, and insufficient dispersion of resins. Alternatively, gels (oxidized or carbonized gels) may be produced as a resin is oxidized when it stays in the extruder for a long period of time, and macromolecules may be formed in a reactor or an extruder by a physicochemical crosslinking reaction to produce gels (or crosslinked gels).

As mentioned above, macromolecules having long chain branches may be formed at the active sites in the pores of a catalyst, which may cause physical crosslinking during extrusion, resulting in the formation of gels.

DETAILED DESCRIPTION OF THE INVENTION

Technical Problem

An object of the present invention is to provide a process for preparing a supported metallocene catalyst capable of producing a polyolefin in which the formation of gels is suppressed by treating it with a metallic stearate after a transition metal compound has been supported.

Technical Solution

According to an embodiment of the present invention for achieving the object, there is provided a process for preparing a supported metallocene catalyst for olefin polymerization, which comprises (1) adding a cocatalyst compound to at least one transition metal compound to activate the transition metal compound; (2) supporting the activated transition metal compound on a carrier; and (3) treating the supported catalyst with a metallic stearate, wherein the content of the metallic stearate is 0.01 to 5.0% by weight based on the total weight of the supported catalyst.

Here, the transition metal compound may be a mixture of a first transition metal compound represented by Formula 1 and a second transition metal compound represented by Formula 2.

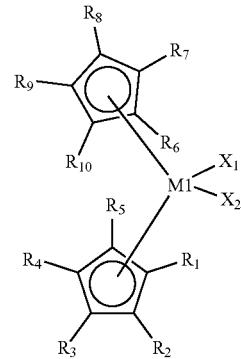

[Formula 1]

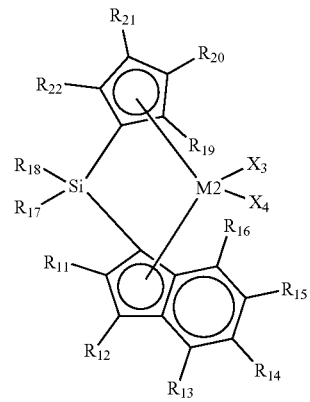

[Formula 2]

In Formulae 1 and 2, M1 and M2 are each independently a transition metal of Group 4 of the Periodic Table of the Elements;

X₁ to X₄ are each independently halogen, an alkyl group having 1-20 carbon atoms, an alkenyl group having 2-20 carbon atoms, an alkynyl group having 2-20 carbon atoms, an aryl group having 6-20 carbon atoms, an alkylaryl group having 7-40 carbon atoms, an arylalkyl group having 7-40 carbon atoms, an alkylamido group having 1-20 carbon atoms, an arylamido group having 6-20 carbon atoms, or an alkylidene group having 1-20 carbon atom;

$R_1$ to $R_{10}$ are each independently hydrogen, a substituted or unsubstituted alkyl group having 1-20 carbon atoms, a substituted or unsubstituted alkenyl group having 2-20 carbon atoms, a substituted or unsubstituted aryl group having 6-20 carbon atoms, a substituted or unsubstituted alkylaryl group having 7-40 carbon atoms, a substituted or unsubstituted arylalkyl group having 7-40 carbon atoms, which are capable of being linked to each other to form a ring, wherein the cyclopentadiene to which $R_1$ to $R_5$ are bonded and the cyclopentadiene to which $R_6$ to $R_{10}$ are bonded may have the same structure or different structures, and the cyclopentadienes form a non-bridged compound since they are not linked;

$R_{11}$ to $R_{16}$ are each independently hydrogen, a substituted or unsubstituted alkyl group having 1-20 carbon atoms, a substituted or unsubstituted alkenyl group having 2-20 carbon atoms, a substituted or unsubstituted aryl group having 6-20 carbon atoms, a substituted or unsubstituted alkylaryl group having 7-40 carbon atoms, a substituted or unsubstituted arylalkyl group having 7-40 carbon atoms, which are capable of being linked to each other to form a ring;

$R_{17}$ to $R_{18}$ are each independently a substituted or unsubstituted alkyl group having 1-20 carbon atoms, a substituted or unsubstituted alkenyl group having 2-20 carbon atoms, a substituted or unsubstituted aryl group having 6-20 carbon atoms, a substituted or unsubstituted alkylaryl group having 7-40 carbon atoms, a substituted or unsubstituted arylalkyl group having 7-40 carbon atoms, which are capable of being linked to each other to form a ring;

$R_{19}$ to $R_{22}$ are each independently hydrogen, a substituted or unsubstituted alkyl group having 1-20 carbon atoms, a substituted or unsubstituted alkenyl group having 2-20 carbon atoms, a substituted or unsubstituted aryl group having 6-20 carbon atoms, a substituted or unsubstituted alkylaryl group having 7-40 carbon atoms, a substituted or unsubstituted arylalkyl group having 7-40 carbon atoms, which are capable of being linked to each other to form a ring, wherein the indene to which $R_{11}$ to $R_{16}$ are bonded and the cyclopentadiene to which $R_{19}$ to $R_{22}$ are bonded have different structures, and the indene and the cyclopentadiene are bonded with silicon (Si) to form a bridge structure.

More preferably, the first transition metal compound comprises at least one selected from the group consisting of [indenyl(cyclopentadienyl)]zirconium dichloride, [4-methylindenyl(cyclopentadienyl)]zirconium dichloride, [indenyl(tetramethylcyclopentadienyl)]zirconium dichloride, [2-methylindenyl(tetramethylcyclopentadienyl)]zirconium dichloride, [2-methylbenzoindenyl(cyclopentadienyl)]zirconium dichloride, and [4,5-benzoindenyl(tetramethylcyclopentadienyl)]zirconium dichloride.

The second transition metal compound comprises at least one selected from the group consisting of rac-dimethylsilylbis(2-methyl-4-phenylindenyl)zirconium dichloride, dimethylsilyl{tetramethylcyclopentadienyl}{2-methyl-4-(4-t-butylphenyl)indenyl}zirconium dichloride, dimethylsilyl(tetramethylcyclopentadienyl)(2-methyl-4-phenylindenyl)zirconium dichloride, and dimethylsilyl(tetramethylcyclopentadienyl)(4-phenylindenyl)zirconium dichloride.

Most preferably, the first transition metal compound may be [indenyl(cyclopentadienyl)]zirconium dichloride represented by Formula 1a, and the second transition metal compound may be rac-dimethylsilylbis(2-methyl-4-phenylindenyl)zirconium dichloride.

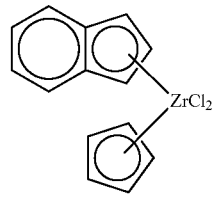

[Formula 1a]

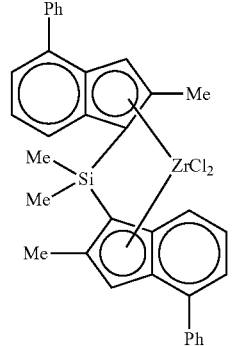

[Formula 2a]

In Formula 2a, Me is a methyl group, and Ph is a phenyl group.

Here, the first transition metal compound and the second transition metal compound may be employed at a weight ratio of 20:1 to 1:20.

Preferably, the cocatalyst compound may comprise at least one selected from the group consisting of a compound represented by Formula 3, a compound represented by Formula 4, and a compound represented by Formula 5.

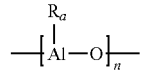

[Formula 3]

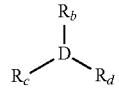

[Formula 4]

$[L-H]^+[Z(A)_4]^-$ or $[L]^+[Z(A)_4]^-$      [Formula 5]

In Formula 3, n is an integer of 2 or more, and $R_a$ may each independently be a halogen atom, a hydrocarbon group having 1-20 carbon atoms, or a hydrocarbon group having 1-20 carbon atoms substituted with halogen.

In Formula 4, D is aluminum (Al) or boron, and $R_b$, $R_c$, and $R_d$ are each independently a halogen atom, a hydrocarbon group having 1-20 carbon atoms, a hydrocarbon group having 1-20 carbon atoms substituted with halogen, or an alkoxy group having 1-20 carbon atoms.

In Formula 5, L is a neutral or cationic Lewis acid, [L-H]⁺ and [L]⁺ a Brönsted acid, Z is a group 13 element, and A is each independently a substituted or unsubstituted aryl group having 6-20 carbon atoms or a substituted or unsubstituted alkyl group having 1-20 carbon atoms.

Specifically, the compound represented by Formula 3 is at least one selected from the group consisting of methylaluminoxane, ethylaluminoxane, isobutylaluminoxane, and butylaluminoxane.

In addition, the compound represented by Formula 4 is at least one selected from the group consisting of trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentyaluminum, trihexyaluminum, trioctyaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, and tributylboron.

In addition, the compound represented by Formula 5 is at least one selected from the group consisting of triethylammonium tetraphenylborate, tributylammonium tetraphenylborate, trimethylammonium tetraphenylborate, tripropylammonium tetraphenylborate, trimethylammonium tetra(p-tolyl)borate, trimethylammonium tetra(o,p-dimethylphenyl)borate, tributylammonium tetra(p-trifluoromethylphenyl)borate, trimethylammonium tetra(p-trifluoromethylphenyl)borate, tributylammonium tetrapentafluorophenylborate, N,N-diethylanilinium tetraphenylborate, N,N-diethylanilinium tetrapentafluorophenylborate, diethylammonium tetrapentafluorophenylborate, triphenylphosphonium tetraphenylborate, trimethylphosphonium tetraphenylborate, triethylammonium tetraphenylaluminate, tributylammonium tetraphenylaluminate, trimethylammonium tetraphenylaluminate, tripropylammonium tetraphenylaluminate, trimethylammonium tetra(p-tolyl)aluminate, tripropylammonium tetra(p-tolyl)aluminate, triethylammonium tetra(o,p-dimethylphenyl)aluminate, tributylammonium tetra(p-trifluoromethylphenyl)aluminate, trimethylammonium tetra(p-trifluoromethylphenyl)aluminate, tributylammonium tetrapentafluorophenylaluminate, N,N-diethylanilinium tetraphenylaluminate, N,N-diethylanilinium tetrapentafluorophenylaluminate, diethylammonium tetrapentatetraphenylaluminate, triphenylphosphonium tetraphenylaluminate, trimethylphosphonium tetraphenylaluminate, tripropylammonium tetra(p-tolyl)borate, triethylammonium tetra(o,p-dimethylphenyl)borate, tributylammonium tetra(p-trifluoromethylphenyl)borate, triphenylcarbonium tetra(p-trifluoromethylphenyl)borate, and triphenylcarbonium tetrapentafluorophenylborate.

Preferably, the carrier may comprise at least one selected from the group consisting of silica, alumina, and magnesia.

More preferably, the first transition metal compound, the second transition metal compound, and the cocatalyst compound may be supported on a single carrier. Specifically, the first transition metal compound, the second transition metal compound, and the cocatalyst may be supported on silica.

In such an event, the total amount of the first transition metal compound and the second transition metal compound supported on the carrier may be 0.5 to 3.0% by weight based on the total weight of the supported catalyst, and the amount of the cocatalyst compound supported on the carrier may be 20 to 30% by weight based on the total weight of the supported catalyst.

Preferably, the metallic stearate may be dissolved or suspended in an amount of 0.01 to 5.0% by weight in at least one organic solvent selected from the group consisting of hexane, pentane, toluene, benzene, dichloromethane, diethyl ether, tetrahydrofuran, acetone, and ethyl acetate, and then used to treat the supported catalyst.

In such an event, the metallic stearate may comprise at least one selected from the group consisting of aluminum stearate, calcium stearate, zinc stearate, magnesium stearate, and sodium stearate.

Advantageous Effects of the Invention

In the process for preparing a supported metallocene catalyst according to an embodiment of the present invention, it is treated with a metallic stearate after a transition metal compound has been supported, which suppresses the formation of a macromolecular polyolefin. Thus, a polyolefin with minimal gel formation can be prepared.

BEST MODE FOR CARRYING OUT THE INVENTION

Hereinafter, the present invention will be described in more detail.

The process for preparing a supported metallocene catalyst for olefin polymerization according to an embodiment of the present invention comprises (1) adding a cocatalyst compound to at least one transition metal compound to activate the transition metal compound; (2) supporting the activated transition metal compound on a carrier; and (3) treating the supported catalyst with a metallic stearate, wherein the content of the metallic stearate is 0.01 to 5.0% by weight based on the total weight of the supported catalyst.

Step (1)

In step (1), a cocatalyst compound is added to at least one transition metal compound to activate the transition metal compound.

Here, the transition metal compound may comprise at least one of a first transition metal compound represented by Formula 1 and a second transition metal compound represented by Formula 2. Preferably, the transition metal compound may be a mixture of a first transition metal compound represented by Formula 1 and a second transition metal compound represented by Formula 2.

[Formula 1]

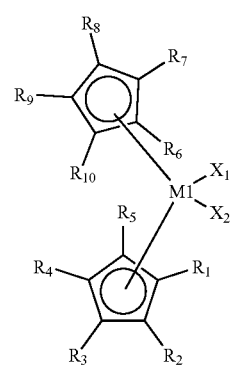

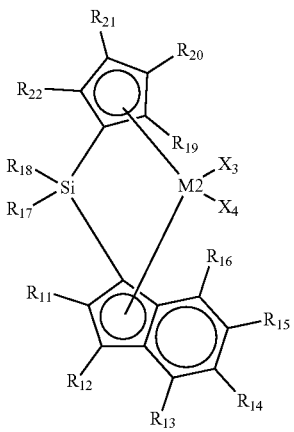

[Formula 2]

In Formulae 1 and 2, M1 and M2 are each independently a transition metal of Group 4 of the Periodic Table of the Elements. Specifically, M1 and M2 may each independently be titanium (Ti), zirconium (Zr), or hafnium (Hf), and more specifically zirconium (Zr).

$X_1$ to $X_4$ are each independently halogen, an alkyl group having 1-20 carbon atoms, an alkenyl group having 2-20 carbon atoms, an alkynyl group having 2-20 carbon atoms, an aryl group having 6-20 carbon atoms, an alkylaryl group having 7-40 carbon atoms, an arylalkyl group having 7-40 carbon atoms, an alkylamido group having 1-20 carbon atoms, an arylamido group having 6-20 carbon atoms, or an alkylidene group having 1-20 carbon atom. Specifically, $X_1$ to $X_4$ may each independently be halogen, and more specifically chlorine (Cl).

$R_1$ to $R_{10}$ are each independently hydrogen, a substituted or unsubstituted alkyl group having 1-20 carbon atoms, a substituted or unsubstituted alkenyl group having 2-20 carbon atoms, a substituted or unsubstituted aryl group having 6-20 carbon atoms, a substituted or unsubstituted alkylaryl group having 7-40 carbon atoms, a substituted or unsubstituted arylalkyl group having 7-40 carbon atoms, which are capable of being linked to each other to form a ring.

In addition, the cyclopentadiene to which $R_1$ to $R_5$ are bonded and the cyclopentadiene to which $R_6$ to $R_{10}$ are bonded may have the same structure or different structures, and the cyclopentadienes may form a non-bridged compound since they are not linked.

$R_{11}$ to $R_{16}$ are each independently hydrogen, a substituted or unsubstituted alkyl group having 1-20 carbon atoms, a substituted or unsubstituted alkenyl group having 2-20 carbon atoms, a substituted or unsubstituted aryl group having 6-20 carbon atoms, a substituted or unsubstituted alkylaryl group having 7-40 carbon atoms, a substituted or unsubstituted arylalkyl group having 7-40 carbon atoms, which are capable of being linked to each other to form a ring.

$R_{17}$ to $R_{18}$ are each independently a substituted or unsubstituted alkyl group having 1-20 carbon atoms, a substituted or unsubstituted alkenyl group having 2-20 carbon atoms, a substituted or unsubstituted aryl group having 6-20 carbon atoms, a substituted or unsubstituted alkylaryl group having 7-40 carbon atoms, a substituted or unsubstituted arylalkyl group having 7-40 carbon atoms, which are capable of being linked to each other to form a ring.

$R_{19}$ to $R_{22}$ are each independently hydrogen, a substituted or unsubstituted alkyl group having 1-20 carbon atoms, a substituted or unsubstituted alkenyl group having 2-20 carbon atoms, a substituted or unsubstituted aryl group having 6-20 carbon atoms, a substituted or unsubstituted alkylaryl group having 7-40 carbon atoms, a substituted or unsubstituted arylalkyl group having 7-40 carbon atoms, which are capable of being linked to each other to form a ring.

In addition, the indene to which $R_{11}$ to $R_{16}$ are bonded and the cyclopentadiene to which $R_{19}$ to $R_{22}$ are bonded have different structures, and the indene and the cyclopentadiene are bonded with silicon (Si) to form a bridge structure.

Preferably, the first transition metal compound may comprise at least one selected from the group consisting of [indenyl(cyclopentadienyl)]zirconium dichloride, [4-methylindenyl(cyclopentadienyl)]zirconium dichloride, [indenyl(tetramethylcyclopentadienyl)]zirconium dichloride, [2-methylindenyl(tetramethylcyclopentadienyl)]zirconium dichloride, [2-methylbenzoindenyl(cyclopentadienyl)]zirconium dichloride, and [4,5-benzoindenyl(tetramethylcyclopentadienyl)]zirconium dichloride.

The second transition metal compound may comprise at least one selected from the group consisting of rac-dimethylsilylbis(2-methyl-4-phenylindenyl)zirconium dichloride, dimethylsilyl{tetramethylcyclopentadienyl}{2-methyl-4-(4-t-butylphenyl)indenyl}zirconium dichloride, dimethylsilyl(tetramethylcyclopentadienyl)(2-methyl-4-phenylindenyl)zirconium dichloride, and dimethylsilyl(tetramethylcyclopentadienyl)(4-phenylindenyl)zirconium dichloride.

More preferably, the first transition metal compound may be [indenyl(cyclopentadienyl)]zirconium dichloride represented by Formula 1a, and the second transition metal compound may be rac-dimethylsilylbis(2-methyl-4-phenylindenyl)zirconium dichloride.

[Formula 1a]

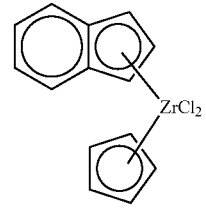

[Formula 2a]

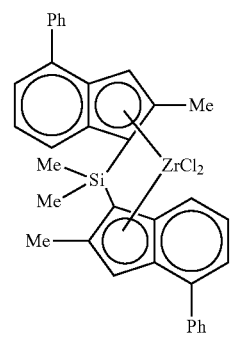

In Formula 2a, Me is a methyl group, and Ph is a phenyl group.

The catalyst for olefin polymerization according to an embodiment of the present invention may comprise the first transition metal compound and the second transition metal compound at a weight ratio of 20:1 to 1:20. Preferably, the catalyst for olefin polymerization may comprise the first transition metal compound and the second transition metal compound at a weight ratio of 10:1 to 1:10. More preferably, the catalyst for olefin polymerization may comprise the first transition metal compound and the second transition metal compound at a weight ratio of 6:4 to 4:6. When the content ratio of the first transition metal compound and the second transition metal compound is within the above range, an appropriate activity of the supported catalyst may be exhibited, which may be advantageous from the viewpoint of maintaining the activity of the catalyst and economical efficiency. Further, a polyolefin prepared in the presence of the catalyst for olefin polymerization, which satisfies the above range, has excellent processability, and a film prepared therefrom may have excellent mechanical and optical properties.

Meanwhile, the cocatalyst compound in step (1) may comprise at least one of a compound represented by Formula 3, a compound represented by Formula 4, and a compound represented by Formula 5.

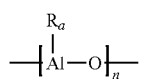

[Formula 3]

In Formula 3, n is an integer of 2 or more, and $R_a$ may each independently be a halogen atom, a hydrocarbon group having 1-20 carbon atoms, or a hydrocarbon group having 1-20 carbon atoms substituted with halogen. Specifically, $R_a$ may be methyl, ethyl, n-butyl, or isobutyl.

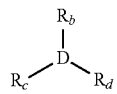

[Formula 4]

In Formula 4, D is aluminum (Al) or boron, and $R_b$, $R_c$, and $R_d$ are each independently a halogen atom, a hydrocarbon group having 1-20 carbon atoms, a hydrocarbon group having 1-20 carbon atoms substituted with halogen, or an alkoxy group having 1-20 carbon atoms. Specifically, when D is aluminum (Al), $R_b$, $R_c$, and $R_d$ may each independently be methyl or isobutyl, and when D is boron (B), $R_b$, $R_c$, and $R_d$ may each be pentafluorophenyl.

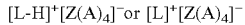

[Formula 5]

In Formula 5, L is a neutral or cationic Lewis acid, $[L-H]^+$ and $[L]^+$ a Brönsted acid, Z is a group 13 element, and A is each independently a substituted or unsubstituted aryl group having 6-20 carbon atoms or a substituted or unsubstituted alkyl group having 1-20 carbon atoms. Specifically, $[LH]^+$ may be a dimethylanilinium cation, $[Z(A)_4]^-$ may be $[B(C_6F_5)_4]^-$, and $[L]^+$ may be $[(C_6H_5)_3C]^+$.

Examples of the compound represented by Formula 3 include methylaluminoxane, ethylaluminoxane, isobutylaluminoxane, butylaluminoxane, and the like. Preferred is methylaluminoxane. But it is not limited thereto.

Examples of the compound represented by Formula 4 include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexyaluminum, trioctyaluminum, ethyldimethylaluminum, methyldiethylaluminum, triphenylaluminum, tri-p-tolylaluminum, dimethylaluminum-methoxide, dimethylaluminumethoxide, trimethylboron, triethylboron, triisobutylboron, tripropylboron, and tributylboron. Preferred are trimethylaluminum, triethylaluminum, and triisobutylaluminum. But it is not limited thereto.

Examples of the compound represented by Formula 5 include triethylammonium tetraphenylborate, tributylammonium tetraphenylborate, trimethylammonium tetraphenylborate, tripropylammonium tetraphenylborate, trimethylammonium tetra(p-tolyl)borate, trimethylammonium tetra (o,p-dimethylphenyl)borate, tributylammonium tetra(p-trifluoromethylphenyl)borate, trimethylammonium tetra(p-trifluoromethylphenyl)borate, tributylammonium tetrapentafluorophenylborate, N,N-diethylanilinium tetraphenylborate, N,N-diethylanilinium tetrapentafluorophenylborate, diethylammonium tetrapentafluorophenylborate, triphenylphosphonium tetraphenylborate, trimethylphosphonium tetraphenylborate, triethylammonium tetraphenylaluminate, tributylammonium tetraphenylaluminate, trimethylammonium tetraphenylaluminate, tripropylammonium tetraphenylaluminate, trimethylammonium tetra(p-tolyl)aluminate, tripropylammonium tetra(p-tolyl)aluminate, triethylammonium tetra(o,p-dimethylphenyl)aluminate, tributylammonium tetra(p-trifluoromethylphenyl)aluminate, trimethylammonium tetra (p-trifluoromethylphenyl)aluminate, tributylammonium tetrapentafluorophenylaluminate, N,N-diethylanilinium tetraphenylaluminate, N,N-diethylanilinium tetrapentafluorophenylaluminate, diethylammonium tetrapentatetraphenylaluminate, triphenylphosphonium tetraphenylaluminate, trimethylphosphonium tetraphenylaluminate, tripropylammonium tetra(p-tolyl)borate, triethylammonium tetra(o,p-dimethylphenyl)borate, tributylammonium tetra(p-trifluoromethylphenyl)borate, triphenylcarbonium tetra(p-trifluoromethylphenyl)borate, and triphenylcarbonium tetrapentafluorophenylborate.

The procedure in which the cocatalyst compound is added to the at least one transition metal compound in step (1) may be carried out in the presence of a solvent. Here, the solvent may be most organic solvents including aliphatic hydrocarbon solvents such as hexane and pentane, aromatic hydrocarbon solvents such as toluene and benzene, hydrocarbon solvents substituted with chlorine atoms such as dichloromethane, ether-based solvents such as diethyl ether and tetrahydrofuran (THF), acetone, and ethyl acetate. Preferred is toluene or hexane, but it is not particularly limited thereto.

The procedure in which the cocatalyst compound is added to the at least one transition metal compound in step (1) may be carried out at a temperature of 0 to 100° C., preferably at a temperature of 10 to 30° C.

In addition, once the cocatalyst compound has been added to the at least one transition metal compound in step (1), it is sufficiently stirred for 5 minutes to 24 hours, preferably 30 minutes to 3 hours.

Step (2)

In step (2), the activated transition metal compound is supported on a carrier.

Here, the carrier may comprise a material containing a hydroxyl group on its surface. Preferably, a material that has been dried to remove moisture from its surface and has a highly reactive hydroxyl group and a siloxane group may be used. For example, the carrier may comprise at least one selected from the group consisting of silica, alumina, and magnesia. Specifically, silica, silica-alumina, and silica-magnesia dried at high temperatures may be used as a carrier. They usually contain oxides, carbonates, sulfates, and nitrates components such as $Na_2O$, $K_2CO_3$, $BaSO_4$, and $Mg(NO_3)_2$. In addition, they may comprise carbon, zeolite, magnesium chloride, and the like. However, the carrier is not limited thereto. It is not particularly limited as long as it can support the first and second transition metal compounds and the cocatalyst compound.

The carrier may have an average particle size of 10 to 250 μm, preferably an average particle size of 10 to 150 μm, and more preferably 20 to 100 μm.

The carrier may have a micropore volume of 0.1 to 10 cc/g, preferably 0.5 to 5 cc/g, and more preferably 1.0 to 3.0 cc/g.

The carrier may have a specific surface area of 1 to 1,000 $m^2/g$, preferably 100 to 800 $m^2/g$, more preferably 200 to 600 $m^2/g$.

In a preferred example, when the carrier is silica, the drying temperature of the silica may be 200 to 900° C. The drying temperature may preferably be 300 to 800° C., more preferably 400 to 700° C. If the drying temperature is lower than 200° C., there would be too much moisture so that the moisture on the surface and the cocatalyst may react. If it exceeds 900° C., the structure of the carrier may collapse.

The dried silica may have a concentration of hydroxy groups of 0.1 to 5 mmole/g, preferably 0.7 to 4 mmole/g, and more preferably 1.0 to 2 mmole/g. If the concentration of hydroxy groups is less than 0.1 mmole/g, the amount of supported cocatalyst may be low. If it exceeds 5 mmole/g, there may arise a problem that the catalyst component may be deactivated.

The procedure in which a mixture of the transition metal compound and the cocatalyst compound is added to the carrier in step (2) may be carried out in the presence of a solvent. Here, the solvent is substantially the same as described in step (1) above.

The procedure in which a mixture of the transition metal compound and the cocatalyst compound is added to the carrier in step (2) may be carried out at a temperature of 0 to 100° C., preferably at a temperature of 10 to 50° C.

In addition, once a mixture of the transition metal compound and the cocatalyst compound has been added to the carrier in step (2), it is sufficiently stirred for 5 minutes to 24 hours, preferably 30 minutes to 3 hours.

Preferably, the first transition metal compound, the second transition metal compound, and the cocatalyst compound may be supported on a single carrier. Specifically, the first transition metal compound, the second transition metal compound, and the cocatalyst may be supported on silica.

In such an event, the total amount of the first transition metal compound and the second transition metal compound supported on the carrier may be 0.5 to 3.0% by weight based on the total weight of the supported catalyst, and the amount of the cocatalyst compound supported on the carrier may be 20 to 30% by weight based on the total weight of the supported catalyst.

Step (3)

In step (3), the supported catalyst is treated with a metallic stearate.

In such an event, the content of the metallic stearate is 0.01 to 5.0% by weight, preferably 0.1 to 4.0% by weight, 0.5 to 3.0% by weight, 0.5 to 2.5% by weight, or 1.0 to 2.0% by weight, based on the total weight of the supported catalyst.

Preferably, the metallic stearate may comprise at least one selected from the group consisting of aluminum stearate, calcium stearate, zinc stearate, magnesium stearate, and sodium stearate, but it is not particularly limited thereto. More preferably, the metallic stearate is aluminum stearate.

The metallic stearate may be added to the supported catalyst in a state in which it is homogeneously dissolved or suspended in an organic solvent or the like. Here, the solvent may be most organic solvents including aliphatic hydrocarbon solvents such as hexane and pentane, aromatic hydrocarbon solvents such as toluene and benzene, hydrocarbon solvents substituted with chlorine atoms such as dichloromethane, ether-based solvents such as diethyl ether and tetrahydrofuran (THF), acetone, and ethyl acetate. Preferred is toluene or hexane, but it is not particularly limited thereto.

The content of the metallic stearate dissolved or suspended in an organic solvent is not particularly limited, but it may preferably be 0.01 to 5.0% by weight, more preferably 0.1 to 4.0% by weight.

In a preferred example, a metallic stearate is dissolved or suspended in an organic solvent in an amount of 0.01 to 5.0% by weight, which is then introduced into the reactor using a cannula and stirred at 60° C. for 1 hour in a nitrogen atmosphere.

The metallocene catalyst system of the present invention comprising at least one metal stearate described above can minimize the static electricity generated by friction between polymer particles or friction between polymer particles and the inner wall of the reactor during the production of polyolefins through gas phase polymerization or slurry polymerization while it is possible to stably maintain the intrinsic activity of the catalyst. It is presumed that the metallocene catalyst system forms the particle size and bulk density of the polymers present in the reactor in a range in which the generation of static electricity due to friction can be minimized.

Step (4)

The process for preparing a supported metallocene catalyst according to an embodiment of the present invention may further comprise (4) washing the supported catalyst as treated with a metallic stearate with a solvent and drying it.

Specifically, upon completion of the treatment with a metallic stearate, it is allowed to stand for 3 minutes to 3 hours to precipitate the supported catalyst. Subsequently, the supernatant is removed to separate the supported catalyst, which is then washed with a solvent and dried for 6 to 48 hours at room temperature to 80° C. to obtain a supported catalyst. Here, the solvent is substantially the same as described in step (1) above.

Meanwhile, an olefinic monomer may be polymerized in the presence of a catalyst prepared by the process for preparing a metallocene catalyst for olefin polymerization according to an embodiment of the present invention to prepared a polyolefin.

Here, the polyolefin may be a homopolymer of an olefinic monomer or a copolymer of an olefinic monomer and an olefinic comonomer.

The olefinic monomer is at least one selected from the group consisting of an alpha-olefin having 2-20 carbon atoms, a diolefin having 1-20 carbon atoms, a cycloolefin having 3-20 carbon atoms, and a cyclodiolefin having 3-20 carbon atoms.

For example, the olefinic monomer may be ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, or the like, and the polyolefin may be a homopolymer comprising only one olefinic monomer or a copolymer comprising two or more olefinic monomers exemplified above.

As an exemplary example, the polyolefin may be a copolymer in which ethylene and an alpha-olefin having 3-20 carbon atoms are copolymerized. Preferred is a copolymer in which ethylene and 1-hexene are copolymerized. But it is not limited thereto.

In such an event, the content of ethylene is preferably 55 to 99.9% by weight, more preferably 90 to 99.9% by weight. The content of the alpha-olefinic comonomer is preferably 0.1 to 45% by weight, more preferably 0.1 to 10% by weight.

The polyolefin according to an embodiment of the present invention may be prepared by polymerization reaction such as free radical, cationic, coordination, condensation, and addition, but it is not limited thereto.

As a preferred example, the polyolefin may be prepared by a gas phase polymerization method, a solution polymerization method, a slurry polymerization method, or the like. When the polyolefin is prepared by a solution polymerization method or a slurry polymerization method, examples of a solvent that may be used include aliphatic hydrocarbon solvents having 5-12 carbon atoms such as pentane, hexane, heptane, nonane, decane, and isomers thereof; aromatic hydrocarbon solvents such as toluene and benzene; hydrocarbon solvents substituted with chlorine atoms such as dichloromethane and chlorobenzene; and mixtures thereof, but it is not limited thereto.

In addition, there may be provided a film molded from the polyolefin prepared according to an embodiment of the present invention.

There is no particular limitation to the method for producing a film according to the embodiment of the present invention, and any method known in the technical field of the present invention can be used. For example, the polyolefin according to an embodiment of the present invention may be molded by a conventional method such as blown film molding, extrusion molding, casting molding, or the like to prepare a film. Blown film molding among the above is the most preferred.

Since the film prepared as described above comprises the polyolefin of the present invention, the formation of gels may be suppressed therein.

Specifically, the film according to an embodiment of the present invention may have a total number of gels reduced by 55% or more, 70% or more, or 80% or more, as compared with a supported metallocene catalyst for olefin polymerization in which the pore volume is not controlled. The film according to an embodiment of the present invention may preferably have a total number of gels reduced by 85% or more, more preferably by 90% or more, as compared with a supported metallocene catalyst for olefin polymerization in which the pore volume is not controlled.

In addition, the film according to an embodiment of the present invention may have a total number of fine gels having a size of 400 μm or less reduced by 70% or more, 75% or more, or 85% or more, as compared with a supported metallocene catalyst for olefin polymerization in which the pore volume is not controlled. The film according to an embodiment of the present invention may preferably have a total number of gels reduced by 90% or more, more preferably by 95% or more, as compared with a supported metallocene catalyst for olefin polymerization in which the pore volume is not controlled.

As described above, the film according to an embodiment of the present invention has excellent transparency and appearance since the number of fine gels having a size of 400 μm or less, as well as the total number of gels, is significantly reduced.

EMBODIMENTS FOR CARRYING OUT THE INVENTION

Example

Hereinafter, the present invention is explained in detail with reference to the following examples and comparative examples. However, the following examples are intended to further illustrate the present invention. The scope of the present invention is not limited thereto only.

Preparation Example 1: Synthesis of [indenyl(cyclopentadienyl)]zirconium dichloride (First Transition Metal Compound)

Indene (5 g, 0.043 mole) was dissolved in hexane (150 ml) in a dry box, which is stirred sufficiently and cooled to −30° C. Thereafter, a 2.5 M n-butyllithium (n-BuLi) solution in hexane (17 ml, 0.043 mole) was slowly dropped into the above hexane solution, and the mixture was stirred at room temperature for 12 hours. The white suspension was filtered through a glass filter to obtain a white solid, which was then sufficiently dried to obtain 5.2 g (yield: 99%) of a lithium indene salt.

In a glove box, (cyclopentadienyl)zirconium trichloride ($CpZrCl_3$) (2.24 g, 8.53 mmoles) was slowly dissolved in ether (30 ml) and then cooled to −30° C. The indene lithium salt (1.05 g, 8.53 mmoles) dissolved in ether (15 ml) was slowly dropped into the ether solution and stirred for 24 hours.

The ether was removed from the resulting yellow suspension under a reduced vacuum pressure, followed by extraction with methylene chloride (50 ml). It was passed through Celite to remove lithium chloride (LiCl) and subjected to drying to obtain 2.82 g (yield: 97%) of [indenyl(cyclopentadienyl)]zirconium dichloride as a purified first metallocene compound.

Preparation Example 2: Synthesis of rac-dimethylsilylbis(2-methyl-4-phenylindenyl)zirconium dichloride (Second Transition Metal Compound)

Step A: Synthesis of 2-methyl-7-phenyl-1H-indene 7-bromo-2-methyl-1H-indene (7 g, 1 eq.) and [1,3-bis(diphenylphosphino)propane]nickel(II) chloride (363 mg, 0.02 eq.) were added to ether (100 ml), and a 3.0 M magnesium bromide solution in ether (8.23 g, 1.05 eq.) was added thereto at 0° C. over 1 hour. Then, the temperature was gradually raised, followed by reflux stirring thereof at 50° C. for 12 hours.

Upon completion of the reaction, the solution was immersed in an ice bath, and 1 N hydrochloric acid was added to lower its pH to 4. The organic layer was extracted, water was removed by treatment with magnesium sulfate ($MgSO_4$), and the solvent was dried to obtain 6.68 g (yield: 97%) of 2-methyl-7-phenyl-1H-indene as a white solid.

Step B: Synthesis of dimethylbis(2-methyl-4-phenylindenyl)silane 2-methyl-7-phenyl-1H-indene (2.14 g, 1 eq.) was added to hexane (50 ml), and a 1.6 M n-butyllithium (n-BuLi) solution in hexane (7.8 ml, 1.2 eq.) was slowly added thereto at −30° C. Then, the temperature was gradually raised to room temperature, followed by stirring thereof for 12 hours. The resulting solid was filtered, washed with hexane, and dried under vacuum. 20 ml of toluene and 5 ml of tetrahydrofuran (THF) were added to the resulting 2-methyl-4phenylindenyl lithium (1.5 g, 2 eq.), and dimethyldichlorosilane (456 mg, 1 eq.) was slowly added thereto at −30° C. Then, the temperature was gradually raised, followed by stirring thereof at 80° C. for 2 hours.

Upon completion of the reaction, the solvent was removed, the organic layer was extracted using a mixed solution of ether and water, and water was removed by treatment with magnesium sulfate. 1.3 g (yield: 80%) of dimethylbis(2-methyl-4-phenylindenyl)silane was obtained through column chromatography. Here, a mixed solution of hexane and methylene chloride having a volume ratio of 20:1 was used as the mobile phase.

Step C: Synthesis of rac-dimethylsilylbis(2-methyl-4-phenylindenyl)zirconium dichloride A 1.6 M n-butyllithium solution in hexane (4 ml, 2.1 eq.) was slowly added to a solution in which dimethylbis(2-methyl-4-phenylindenyl)silane (1.4 g, 1 eq.) had been dissolved in ether (20 ml) at −30° C. Then, the temperature was gradually raised to room temperature, followed by stirring thereof for 12 hours. The solvent was dried, and the resulting solid was washed with hexane and dried under vacuum to obtain a dilithium salt. A solution of dilithium salt (1 g, 2 eq.) in ether (100 ml) was slowly added to zirconium chloride ($ZrCl_4$) (484 mg, 1 eq.) at −30° C. Then, the temperature was gradually raised, followed by stirring thereof for 4 hours.

Upon completion of the reaction, the solvent was removed, and 130 mg (yield: 10%) of rac-dimethylsilylbis (2-methyl-4-phenylindenyl)zirconium dichloride was obtained through recrystallization using methylene chloride as a recrystallization solvent.

Example 1

751 g of methylaluminoxane (as a 10% by weight solution in toluene) was added to a 2-liter rounded glass reactor in a glove box. 1.2 g of the first transition metal compound of Preparation Example 1 and 3.33 g of the second transition metal compound of Preparation Example 2 were dissolved in 130 ml of toluene, which was introduced into the reactor using a cannula, and the mixture was stirred at 25° C. for 1 hour. Meanwhile, 200 g of silica (XPO2402, Grace Davison) was added to the reactor, followed by stirring thereof at 75° C. for 3 hours in a nitrogen atmosphere. Subsequently, 4.2 g of aluminum distearate (Al-St) was suspended in 150 ml of toluene, which was introduced into the reactor using a cannula, followed by stirring thereof at 60° C. for 1 hour in a nitrogen atmosphere. Upon completion of the supporting, when the solid/liquid was sufficiently separated, the supernatant was removed. The supported catalyst was washed three times with toluene and dried at 60° C. under vacuum for 30 minutes to obtain 268 g of a hybrid supported catalyst in the form of a free-flowing powder.

Examples 2 to 4

275 g, 259 g, and 266 g of hybrid supported catalysts were each obtained in the same manner as in Example 1, except that zinc distearate (Zn-St), magnesium distearate (Mg-St), and calcium distearate (Ca-St) were used instead of aluminum distearate, respectively.

Example 5

270 g of a hybrid supported catalyst was obtained in the same manner as in Example 1, except that aluminum distearate was added in an amount of 3.0% by weight.

Comparative Example 1

263 g of a hybrid supported catalyst was obtained in the same manner as in Example 1, except that aluminum distearate was not used.

Comparative Example 2

272 g of a hybrid supported catalyst was obtained in the same manner as in Example 1, except that aluminum distearate was added in an amount of 6.0% by weight.

Comparative Example 3

268 g of a hybrid supported catalyst was obtained in the same manner as in Example 1, except that alkylamine ethoxylate (ASA) was used instead of aluminum distearate.

The preparation conditions for the catalysts in Examples 1 to 5 and Comparative Examples 1 to 3 are summarized in Table 1 below.

TABLE 1

| | Content of MAO | Additive | |
|---|---|---|---|
| | (% by weight) | Type | Content (% by weight) |
| Ex. 1 | 12.5 | Al-St | 1.5 |
| Ex. 2 | 12.5 | Zn-St | 1.5 |
| Ex. 3 | 12.5 | Mg-St | 1.5 |
| Ex. 4 | 12.5 | Ca-St | 1.5 |
| Ex. 5 | 12.5 | Al-St | 3.0 |
| C. Ex. 1 | 12.5 | — | 0 |
| C. Ex. 2 | 12.5 | Al-St | 6.0 |
| C. Ex. 3 | 12.5 | ASA | 1.5 |

Test Example

Ethylene and 1-hexene were copolymerized in a fluidized-bed gas-phase reactor for 1 hour in the presence of 50 mg of each of the hybrid supported catalysts obtained in Examples 1 to 5 and Comparative Examples 1 to 3 and 0.5 ml of 1M triisobutyl aluminum (TIBAL) as a scavenger. The temperature in the reactor was maintained at about 80° C., and the degree of polymerization of the ethylene/1-hexene copolymer prepared was adjusted by adding hydrogen in addition to ethylene and 1-hexene. Here, the pressure of ethylene was 14 kgf/cm$^2$, and the amount of 1-hexene was 15 cc. The activities of the catalysts during polymerization are shown in Table 2.

Subsequently, the ethylene/1-hexene copolymer was extruded in an extruder having a screw of 40 mm in diameter, a die of 75 mm in diameter, and a die gap of 2 mm at a screw speed of 80 rpm, and it was then subjected to cast molding in a width of 41 mm and an area of 2.0 m$^2$ to obtain a film having a thickness of 60 μm.

The number of total gels and the number of fine gels having a size of 400 μm or less present in each film having a size of 2.0 m$^2$ as described above were visually measured. The results are shown in Table 2.

TABLE 2

|        | Catalytic activity (gPE/gCat-hr) | Reduced catalyst activity as compared with C. Ex. 1 (%) | Number of total gels | Number of fine gels | Reduced number of gels (%) as compared with C. Ex. 1 | |
|--------|---------|------|---------|--------|------|------|
|        |         |      |         |        | Total gels | Fine gels |
| Ex. 1  | 3,000   | 6.3  | 67,944  | 2,626  | 89.4 | 94.3 |
| Ex. 2  | 2,934   | 8.3  | 284,564 | 12,415 | 55.8 | 72.9 |
| Ex. 3  | 2,945   | 7.9  | 234,852 | 9,452  | 63.4 | 79.3 |
| Ex. 4  | 2,971   | 7.1  | 184,872 | 6,125  | 71.2 | 86.6 |
| Ex. 5  | 2,850   | 10.9 | 32,856  | 1,065  | 94.9 | 97.7 |
| C. Ex. 1 | 3,200 | —    | 642,478 | 45,745 | —    | —    |
| C. Ex. 2 | 2,600 | 18.8 | 14,412  | 745    | 97.8 | 98.4 |
| C. Ex. 3 | 2,962 | 7.4  | 639,748 | 44,749 | 0.4  | 2.2  |

As can be seen from Table 2, the polyolefins produced in the presence of the hybrid supported catalyst prepared in the examples of the present invention were reduced by about 56% or more in the number of total gels and by about 73% or more in the number of fine gels as compared with the polyolefin produced in the presence of the hybrid supported catalyst prepared in Comparative Example 1.

Meanwhile, when Examples 1 and 5 are compared with Comparative Example 2, the total number of gels and the number of fine gels were reduced as the content of metal stearate was increased, whereas the catalyst activity was decreased. Accordingly, if the content of the metallic stearate exceeds 5.0% by weight based on the total weight of the supported catalyst, the catalyst activity may not be sufficient, which is not preferable.

In addition, when Comparative Example 1 and Comparative Example 3 are compared, the alkylamine ethoxylate-based antistatic agent, unlike the metallic stearates, substantially had no effect of reducing gels.

INDUSTRIAL APPLICABILITY

The hybrid supported catalyst prepared according to the embodiment of the present invention can provide a polyolefin film that has excellent transparency and appearance since the formation of gels is significantly suppressed. This film can be advantageously used as a stretch film, an overlap film, a ramie, a silage wrap, an agricultural film, and the like.

The invention claimed is:

1. A process for preparing a supported metallocene catalyst for olefin polymerization capable of producing a polyolefin in which the formation of gels is suppressed, which comprises (1) adding a cocatalyst compound to at least one transition metal compound to activate the transition metal compound in a reactor; (2) adding a carrier to the reactor after step (1) and supporting the activated transition metal compound on the carrier in the reactor; and (3) introducing a single treatment agent which is a metallic stearate into the reactor after step (2) and treating the supported catalyst with the single treatment agent in the reactor, wherein the content of the single treatment agent is 0.01 to 5.0% by weight based on the total weight of the supported catalyst, and the transition metal compound is a mixture of a first transition metal compound comprising at least one selected from the group consisting of [indenyl(cyclopentadienyl)]zirconium dichloride, [4-methylindenyl(cyclopentadienyl)]zirconium dichloride, [indenyl(tetramethylcyclopentadienyl)]zirconium dichloride, [2-methylindenyl(tetramethylcyclopentadienyl)]zirconium dichloride, [2-methylbenzoindenyl(cyclopentadienyl)]zirconium dichloride, and [4,5-benzoindenyl(tetramethylcyclopentadienyl)]zirconium dichloride; and a second transition metal compound comprising at least one selected from the group consisting of rac-dimethylsilylbis(2-methyl-4-phenylindenyl)zirconium dichloride, dimethylsilyl{tetramethylcyclopentadienyl}{2-methyl-4-(4-t-butylphenyl) indenyl}zirconium dichloride, dimethylsilyl(tetramethylcyclopentadienyl)(2-methyl-4-phenylindenyl)zirconium dichloride, and dimethylsilyl(tetramethylcyclopentadienyl)(4-phenylindenyl)zirconium dichloride; wherein, in step (3), the single treatment agent is dissolved or suspended in an amount of 0.01 to 5.0% by weight in at least one organic solvent selected from the group consisting of hexane, pentane, toluene, benzene, dichloromethane, diethyl ether, tetrahydrofuran, acetone, and ethyl acetate, and then used to treat the supported catalyst, and wherein the metallic stearate comprises at least one selected from the group consisting of aluminum stearate, calcium stearate, zinc stearate, magnesium stearate, and sodium stearate.

2. The process for preparing a supported metallocene catalyst for olefin polymerization of claim 1, wherein the first transition metal compound is [indenyl(cyclopentadienyl)]zirconium dichloride represented by Formula 1a, and the second transition metal compound is rac-dimethylsilyl-bis(2-methyl-4-phenylindenyl)zirconium dichloride,

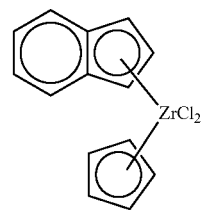

[Formula 1a]

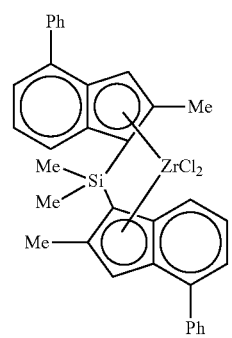

[Formula 2a]

In Formula 2a, Me is a methyl group, and Ph is a phenyl group.

3. The process for preparing a supported metallocene catalyst for olefin polymerization of claim 1, wherein the first transition metal compound and the second transition metal compound are employed at a weight ratio of 20:1 to 1:20.

4. The process for preparing a supported metallocene catalyst for olefin polymerization of claim 1, wherein the cocatalyst compound is at least one selected from the group consisting of a compound represented by Formula 3, a compound represented by Formula 4, and a compound represented by Formula 5:

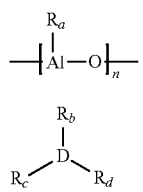

[Formula 3]

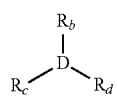

[Formula 4]

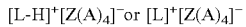

$[L-H]^+[Z(A)_4]^-$ or $[L]^+[Z(A)_4]^-$ [Formula 5]

in Formula 3, n is an integer of 2 or more, and Ra is each independently a halogen atom, a hydrocarbon group having 1-20 carbon atoms, or a hydrocarbon group having 1-20 carbon atoms substituted with halogen, in Formula 4, D is aluminum (Al) or boron, and $R_b$, $R_c$, and $R_d$ are each independently a halogen atom, a hydrocarbon group having 1-20 carbon atoms, a hydrocarbon group having 1-20 carbon atoms substituted with halogen, or an alkoxy group having 1-20 carbon atoms, and in Formula 5, L is a neutral or cationic Lewis acid, $[L-H]^+$ and $[L]^+$ a Brönsted acid, Z is a group 13 element, and A is each independently a substituted or unsubstituted aryl group having 6-20 carbon atoms or a substituted or unsubstituted alkyl group having 1-20 carbon atoms.

5. The process for preparing a supported metallocene catalyst for olefin polymerization of claim 4, wherein the compound represented by Formula 3 is at least one selected from the group consisting of methylaluminoxane, ethylaluminoxane, isobutylaluminoxane, and butylaluminoxane.

6. The process for preparing a supported metallocene catalyst for olefin polymerization of claim 4, wherein the compound represented by Formula 4 is at least one selected from the group consisting of trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentyaluminum, trihexyaluminum, trioctyaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, and tributylboron.

7. The process for preparing a supported metallocene catalyst for olefin polymerization of claim 4, wherein the compound represented by Formula 5 is at least one selected from the group consisting of triethylammonium tetraphenylborate, tributylammonium tetraphenylborate, trimethylammonium tetraphenylborate, tripropylammonium tetraphenylborate, trimethylammonium tetra(p-tolyl)borate, trimethylammonium tetra(o,p-dimethylphenyl)borate, tributylammonium tetra(p-trifluoromethylphenyl)borate, trimethylammonium tetra(p-trifluoromethylphenyl)borate, tributylammonium tetrapentafluorophenylborate, N,N-diethylanilinium tetraphenylborate, N,N-diethylanilinium tetrapentafluorophenylborate, diethylammonium tetrapentafluorophenylborate, triphenylphosphonium tetraphenylborate, trimethylphosphonium tetraphenylborate, triethylammonium tetraphenylaluminate, tributylammonium tetraphenylaluminate, trimethylammonium tetraphenylaluminate, tripropylammonium tetraphenylaluminate, trimethylammonium tetra(p-tolyl)aluminate, tripropylammonium tetra(p-tolyl)aluminate, triethylammonium tetra(o,p-dimethylphenyl)aluminate, tributylammonium tetra(p-trifluoromethylphenyl)aluminate, trimethylammonium tetra(p-trifluoromethylphenyl)aluminate, tributylammonium tetrapentafluorophenylaluminate, N,N-diethylanilinium tetraphenylaluminate, N,N-diethylanilinium tetrapentafluorophenylaluminate, diethylammonium tetrapentatetraphenylaluminate, triphenylphosphonium tetraphenylaluminate, trimethylphosphonium tetraphenylaluminate, tripropylammonium tetra(p-tolyl)borate, triethylammonium tetra(o,p-dimethylphenyl)borate, tributylammonium tetra(p-trifluoromethylphenyl)borate, triphenylcarbonium tetra(p-trifluoromethylphenyl)borate, and triphenylcarbonium tetrapentafluorophenylborate.

8. The process for preparing a supported metallocene catalyst for olefin polymerization of claim 1, wherein the carrier comprises at least one selected from the group consisting of silica, alumina, and magnesia.

9. The process for preparing a supported metallocene catalyst for olefin polymerization of claim 8, wherein the first transition metal compound, the second transition metal compound, and the cocatalyst compound are supported on a single carrier.

10. The process for preparing a supported metallocene catalyst for olefin polymerization of claim 9, wherein the first transition metal compound, the second transition metal compound, and the cocatalyst compound are supported on silica.

11. The process for preparing a supported metallocene catalyst for olefin polymerization of claim 9, wherein the total amount of the first transition metal compound and the second transition metal compound supported on the carrier is 0.5 to 3.0% by weight based on the total weight of the supported catalyst, and the amount of the cocatalyst compound supported on the carrier is 20 to 30% by weight based on the total weight of the supported catalyst.

* * * * *